(12) United States Patent
Peipelman et al.

(10) Patent No.: US 11,176,017 B2
(45) Date of Patent: Nov. 16, 2021

(54) MEASUREMENT OF SIMULATED MIRRORING IN A DATA STORAGE SYSTEM

(71) Applicant: International Business Machines Corporation, Armonk, NY (US)

(72) Inventors: Jason L. Peipelman, Travis, TX (US); Paul Jennas, Tucson, AZ (US); Joshua J. Crawford, Tucson, AZ (US); Matthew J. Ward, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 425 days.

(21) Appl. No.: 16/226,480

(22) Filed: Dec. 19, 2018

(65) Prior Publication Data
US 2020/0201740 A1 Jun. 25, 2020

(51) Int. Cl.
*G06F 11/34* (2006.01)
*G06F 3/06* (2006.01)

(52) U.S. Cl.
CPC .......... *G06F 11/3457* (2013.01); *G06F 3/065* (2013.01); *G06F 3/0614* (2013.01); *G06F 3/0658* (2013.01); *G06F 3/0673* (2013.01)

(58) Field of Classification Search
CPC . G06F 3/614; G06F 3/65; G06F 3/658; G06F 3/673; G06F 11/3457
USPC .................. 703/21; 711/14, 162; 718/104
See application file for complete search history.

(56) References Cited

U.S. PATENT DOCUMENTS

| 6,865,514 | B1 | 3/2005 | Goguen et al. |
| 7,039,777 | B2* | 5/2006 | Yamagami .......... G06F 11/2058 711/114 |
| 7,103,619 | B1* | 9/2006 | Rajpurkar ............. G06F 16/273 |
| 7,292,969 | B1 | 11/2007 | Aharoni et al. |

(Continued)

FOREIGN PATENT DOCUMENTS

EP    2843537 A1    3/2015

OTHER PUBLICATIONS

Bigang, L. et al., "Design and Implementation of a Storage Virtualization System Based on SCSI Target Simulator in SAN", Department of Computer Science and Technology, Tsinghua University, Beijing 100084, China, Tsinghua Science and Technology, ISSN 1007-0214 17/18 pp. I22-127, vol. 10, No. 1, Feb. 2005, retrieved from the Internet at <URL: https://ieeexplore.ieee.org/stamp/stamp.jsp?arnumber=6076003>, Total 6 pp.

*Primary Examiner* — Prabodh M Dharia
(74) *Attorney, Agent, or Firm* — Konrad Raynes Davda & Victor LLP

(57) ABSTRACT

A simulation tool provides candidate volume mirror simulation in a data storage system. In one embodiment, user selections are received including a user selection of one or more candidate volumes of a primary data storage system for simulating mirroring to a secondary data storage system. As a function of received user selections, host-to-primary I/O activity to a candidate volume is simulated, recorded and measured over a selected interval of time. In addition, primary-to-secondary mirroring of a selected candidate volume to the secondary data storage system is simulated, recorded and measured over the interval of time. Performance measurements of the candidate volume mirror simulation are output by the simulation tool. Other features and aspects may be realized, depending upon the particular application.

27 Claims, 9 Drawing Sheets

(56) References Cited

U.S. PATENT DOCUMENTS

| | | | | |
|---|---|---|---|---|
| 7,650,476 B2* | 1/2010 | Ashour | ............... | G06F 11/2064 |
| | | | | 711/162 |
| 8,938,477 B1 | 1/2015 | Tang et al. | | |
| 9,632,716 B1* | 4/2017 | Harris, Jr. | ............. | G06F 3/0683 |
| 9,727,432 B1 | 8/2017 | Cutforth et al. | | |
| 2007/0233449 A1 | 10/2007 | Peterson et al. | | |
| 2007/0245107 A1* | 10/2007 | Kano | ................... | G06F 11/1435 |
| | | | | 711/163 |
| 2008/0072000 A1* | 3/2008 | Osaki | ................. | G06F 11/2094 |
| | | | | 711/162 |
| 2008/0133828 A1* | 6/2008 | Saito | .................... | G06F 11/1451 |
| | | | | 711/111 |
| 2008/0162845 A1* | 7/2008 | Cox | .................... | G06F 11/2058 |
| | | | | 711/162 |
| 2009/0281782 A1* | 11/2009 | Bitar | ................... | G06F 11/3409 |
| | | | | 703/21 |
| 2013/0067188 A1* | 3/2013 | Mehra | ................... | G06F 3/0689 |
| | | | | 711/170 |
| 2014/0143786 A1* | 5/2014 | Ripberger | ............. | G06F 3/0605 |
| | | | | 718/104 |
| 2016/0378625 A1* | 12/2016 | Aizer | ...................... | G06F 3/065 |
| | | | | 714/6.3 |
| 2017/0351968 A1* | 12/2017 | Bowers | ................ | G06F 3/0608 |
| 2019/0243703 A1* | 8/2019 | Rooney | ............... | G06F 11/2082 |

* cited by examiner

MEASUREMENT OF SIMULATED MIRRORING IN A DATA STORAGE SYSTEM

BACKGROUND OF THE INVENTION

1. Field of the Invention

The present invention relates to a computer program product, system, and method for measurement of simulated mirroring in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

Recovery Point Objective or RPO is frequently a very important metric to customers in a mirror environment in which the remote site is separated from the local site by a large distance. RPO is an indication of how far behind a secondary storage site is with respect to data from a primary storage site due to transmission delays and other factors. The higher the RPO the longer it can take for the system to recover at the secondary site from a disaster at the primary site. It is not uncommon that every minute operations are down or not fully recovered, can cause significant financial loss.

As a simplification, RPO can be thought of as a measure of the incoming data rate to the primary site versus outgoing data rate from the primary site to the secondary site. The outgoing data rate from the primary site to the secondary site typically is a function of the available bandwidth between the primary and secondary site and indeed is typically a major factor affecting the outgoing data rate. Bandwidth is frequently very expensive and customers often cannot afford to purchase enough bandwidth to handle peak incoming workloads. Also many customers are charged by usage and would prefer to use as little bandwidth as possible. RPO is affected by other factors such as the degree and type of workload being carried by the data storage system.

Another important metric of data storage performance is latency which measures the delay between a host issuing an input/output instruction or command, and receipt by the host that the instruction has been successfully completed. Like RPO, latency is also affected by bandwidth, workload and other factors.

Yet another metric of data storage performance is time to synchronize (or time to sync) which measures the total time to copy one volume to another. Like RPO and latency, time to sync is also affected by bandwidth, workload and other factors.

Various tools have been developed to measure the real-time performance of data storage systems. These tools measure metrics such as RPO, latency and time to sync, to provide measurement data to a customer how indicating how well the data storage system is performing in storing and mirroring the customer's data being generated in the course of the customer's business operations.

In data mirroring systems, data is typically maintained in volume pairs, comprising a primary volume in a primary storage device and a corresponding secondary or target volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices. In certain storage system environments, a storage controller (or a storage controller complex) comprises a plurality of storage servers that are coupled to each other. The storage controller allows host computing systems to perform input/output (I/O) operations with storage devices controlled by the storage controller, where the host computing systems are often referred to as hosts.

Certain mirroring mechanisms may control the formation of consistency groups for generating consistency copies of data. A consistency group is a collection of volumes across multiple storage units that are managed together when creating consistent copies of data. The order of dependent writes where the start of one write operation is dependent upon the completion of a previous write to a storage volume, is preserved in consistency groups. The formation of these consistency groups may be controlled by a primary storage controller which sends commands over remote copy processes and copies volumes to the secondary storage controller.

A data structure such as an out-of-synchronization (or "out-of-sync" or OOS) bitmap is frequently used to identify which tracks involved in a remote copy relationship have not yet been copied over to the secondary volume. Each track is typically represented by one bit in the OOS bitmap. A bit is set when the corresponding track is to be copied. The bit is reset (i.e., unset) when the corresponding track has been copied from the primary storage controller to the secondary storage controller.

SUMMARY

Measurement of simulated mirroring in accordance with the present description provides a significant improvement in computer technology. In one embodiment, simulated mirror measurement in accordance with the present description includes receiving user selections including a user selection of a candidate volume of a primary data storage system for mirroring to a secondary data storage system, simulating as a function of received user selections, mirroring of a selected candidate volume to the secondary data storage system in a candidate volume mirror simulation over a first interval of time, and measuring performance of the candidate volume mirror simulation. As a result, the impact on system performance of mirroring additional volumes may be simulated and measured before actually committing the additional volumes to the mirroring of important actual data.

In another aspect, measurement of simulated mirroring in accordance with the present description includes receiving the user selections through a user interface of a data storage system where the user selections include a user selection of duration of the first interval of time of the candidate volume mirror simulation, and user selection of a maximum bandwidth between the primary data storage system and the secondary data storage system. These user selected parameters for the simulation and measurement, can significantly improve the accuracy and predictive value of the simulation.

In yet another aspect of simulated mirror measurement in accordance with the present description, a first interval of time of the candidate volume mirror simulation includes a plurality of subintervals of time and the candidate volume mirror simulation includes recording input/output (I/O) activity directed to at least one primary volume of the primary data storage system over each subinterval of time and measuring current host-to-primary performance of I/O activity recorded over each subinterval of time. It is appreciated that providing control over the granularity of the measurement of simulated mirroring can also improve the accuracy and predictive value of the simulation while balancing the impact of the simulation upon system resources such as processing and storage resources, for example.

In one embodiment, measuring current host-to-primary performance of recorded I/O activity, includes measuring current host-to-primary throughput, current host-to-primary latency of the recorded I/O activity, and cache hits versus cache waits of the recorded I/O activity. Measurement of these different metrics of the host-to-primary portion of the simulation further enhances the accuracy and predictive value of the simulation tool.

In one embodiment, these metrics include determining at least one of an expected host-to-primary throughput for each subinterval of time as a function of measured current host-to-primary throughput for each subinterval of time, and an average expected host-to-primary throughput for the first interval of time based upon an average of determined expected host-to-primary throughput for each subinterval of time. In another embodiment, the metrics include determining at least one of an expected host-to-primary latency for each subinterval of time as a function of measured current host-to-primary latency for each subinterval of time and an average expected host-to-primary latency for the first interval of time based upon an average of determined expected host-to-primary latencies for each subinterval of time. It is appreciated that each of these metrics further enhances the accuracy and predictive value of the simulation tool.

In still another embodiment, the candidate volume mirror simulation includes sending test packets of data from the primary data storage system to the secondary data storage system over each subinterval of time, where a portion of the test packets sent each subinterval of time are directed to cache of the secondary data storage system and a portion of the test packets sent each subinterval of time are directed to a plurality of different classes of storage of the secondary data storage system. Primary-to-secondary latencies of test packets sent to the secondary data storage system are measured over each subinterval of time including measuring primary-to-secondary latencies of test packets sent to the cache of the secondary data storage system over each subinterval of time and measuring primary-to-secondary latencies of test packets sent to the plurality of different classes of storage of the secondary data storage system over each subinterval of time for each class of storage of the secondary data storage system. It is appreciated that by sending relatively few test packets to the secondary each subinterval rather than mirroring all the simulation data which was directed to the primary, a significant reduction in any impact of the simulation on the primary-to-secondary network and the processing workload of the secondary may be achieved.

In another aspect, measurement of simulated mirroring in accordance with the present description includes determining an expected primary-to-secondary latency for each subinterval of time as a function of measured primary-to-secondary latencies of test packets sent to the secondary data storage system over each subinterval of time including measured primary-to-secondary latencies of test packets sent to the cache of the secondary data storage system over each subinterval of time and measured primary-to-secondary latencies of test packets sent to the plurality of different classes of storage of the secondary data storage system over each subinterval of time for each class of storage of the secondary data storage system. In another embodiment, an average expected primary-to-secondary latency for the first interval of time may be determined based upon an average of determined expected primary-to-secondary latencies for each subinterval of time. It is appreciated that each of these metrics further enhances the accuracy and predictive value of the simulation tool.

In yet another aspect, measurement of simulated mirroring in accordance with the present description includes determining at least one of an expected recovery point objective (RPO) for each subinterval of time and an average expected RPO for the first interval of time based upon an average of the expected recovery point objective (RPO) for each subinterval of time. Here too, it is appreciated that each of these metrics further enhances the accuracy and predictive value of the simulation tool.

Implementations of the described techniques may include hardware, a method or process, or computer software on a computer-accessible medium. Other features and aspects may be realized, depending upon the particular application.

DETAILED DESCRIPTION

Figure 1:
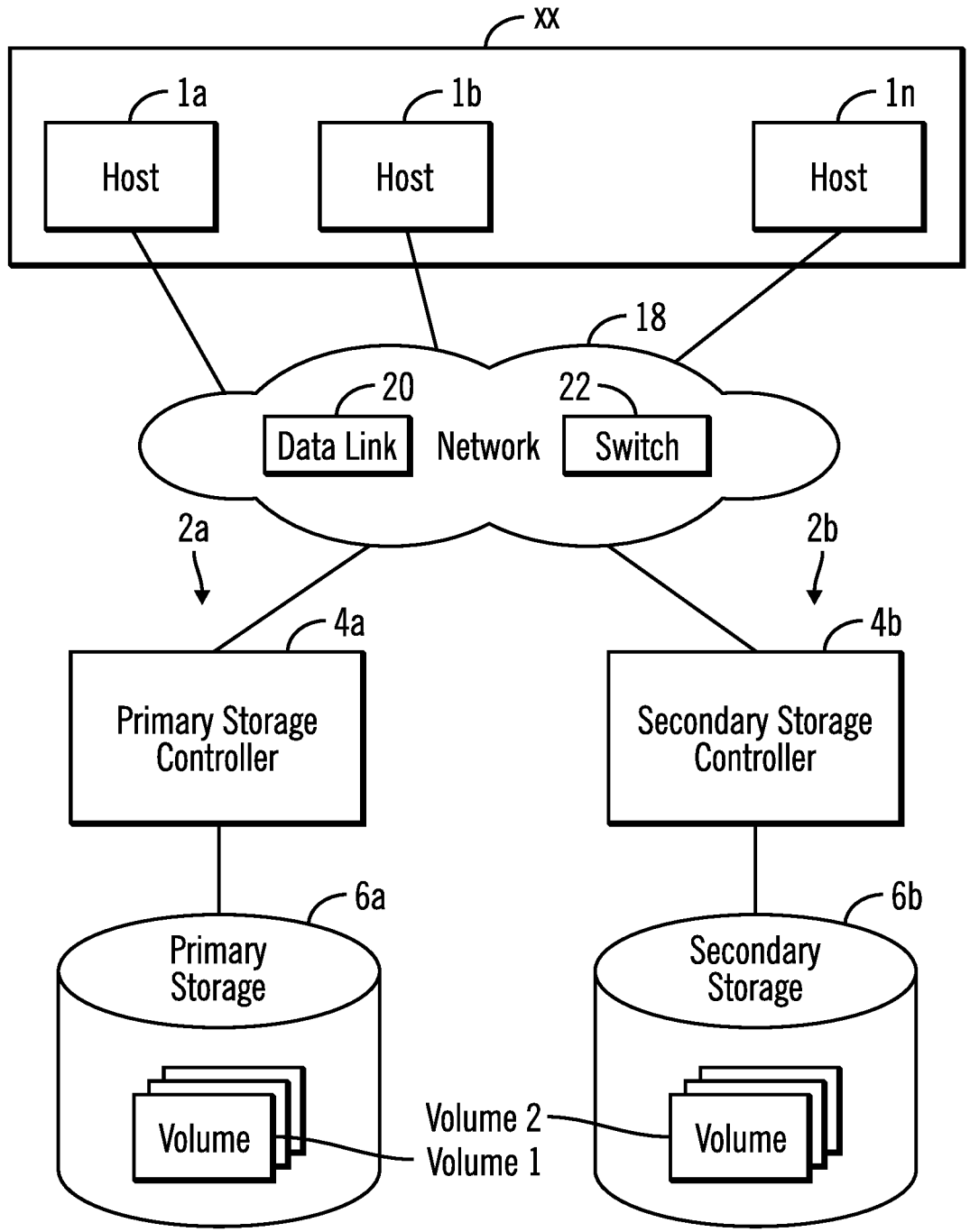
FIG. 1 illustrates an embodiment of a computing environment employing measurement of simulated mirroring in a data storage system in accordance with one aspect of the present description.

Measurement of simulated mirroring in accordance with the present description provides a significant improvement in computer technology. For example, in one embodiment, the impact on system performance of mirroring additional volumes may be simulated and measured before actually committing the additional volumes to the mirroring of important actual data. Depending upon the outcome of the mirroring simulation, more informed decisions may be made as to whether the additional volumes may be safely committed to mirroring actual data using the existing data storage systems. For example, simulated mirroring of additional volumes may indicate that significant upgrades to network bandwidth and/or system processing capabilities are in order to be able to safely commit additional volumes to mirroring actual data. Alternatively, simulated mirroring of additional volumes may indicate that the existing system has significant unused capability such that expensive upgrades to network bandwidth and/or system processing capabilities are not needed to safely commit additional volumes to mirroring actual data. Still further, simulated mirroring of additional volumes may indicate that the existing system has so much unused capability such that significant downgrades to network bandwidth and/or system processing capabilities may be undertaken to achieve significant operational cost savings without adversely impacting the ability to safely commit additional volumes to mirroring actual data. Thus, a user may have, for example, the option of purchasing less bandwidth to support the data backup system without adversely affecting the system.

In one aspect of candidate volume mirror simulation and measurement in accordance with the present description, a user interface receives various user selected parameters for the simulation and measurement, which can significantly improve the accuracy and predictive value of the simulation. In one embodiment, these user selected parameters include candidate volume selection, simulation interval and subinterval selection, candidate volume workload, and candidate volume workload data access patterns. Each of these user selected parameters can significantly improve the accuracy and predictive value of the simulation tool as described in greater detail below.

In another aspect of candidate volume mirror simulation and measurement in accordance with the present description, test packets of test data may be mirrored from the primary to the secondary each subinterval of the candidate volume mirror simulation. By sending relatively few test packets to the secondary each subinterval rather than mirroring all the simulation data which was directed to the primary, a significant reduction in any impact of the simulation on the primary-to-secondary network and the processing workload of the secondary may be achieved.

In yet another aspect of candidate volume mirror simulation and measurement in accordance with the present description, simulation data may be directed both to cache and directly to different classes of storage, bypassing the cache. By directing simulation data along the various data paths of a primary and/or secondary data storage system, the accuracy and predictive value of the simulation tool may be improved as described in greater detail below.

In yet another aspect of candidate volume mirror simulation and measurement in accordance with the present description, measurement logic determines and outputs a variety of different metrics of data storage system performance. These metrics include throughput, latency, RPO and time to sync, as a function of one or both of host-to-primary I/O simulation and primary-to-secondary mirror simulation. These metrics further facilitate the predictive value of the simulation tool.

It is seen from the above that a data storage system employing measurement of simulated mirroring in accordance with the present description, in one embodiment, significantly improves efficient and economical operation of a data storage system. Other aspects and advantages may be realized, depending upon the particular application.

A system of one or more computers may be configured for measurement of simulated mirroring in a data storage system in accordance with the present description, by virtue of having software, firmware, hardware, or a combination of them installed on the system that in operation causes or cause the system to perform measurement of simulated mirroring in accordance with the present description. For example, one or more computer programs may be configured to perform measurement of simulated mirroring in a data storage system by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
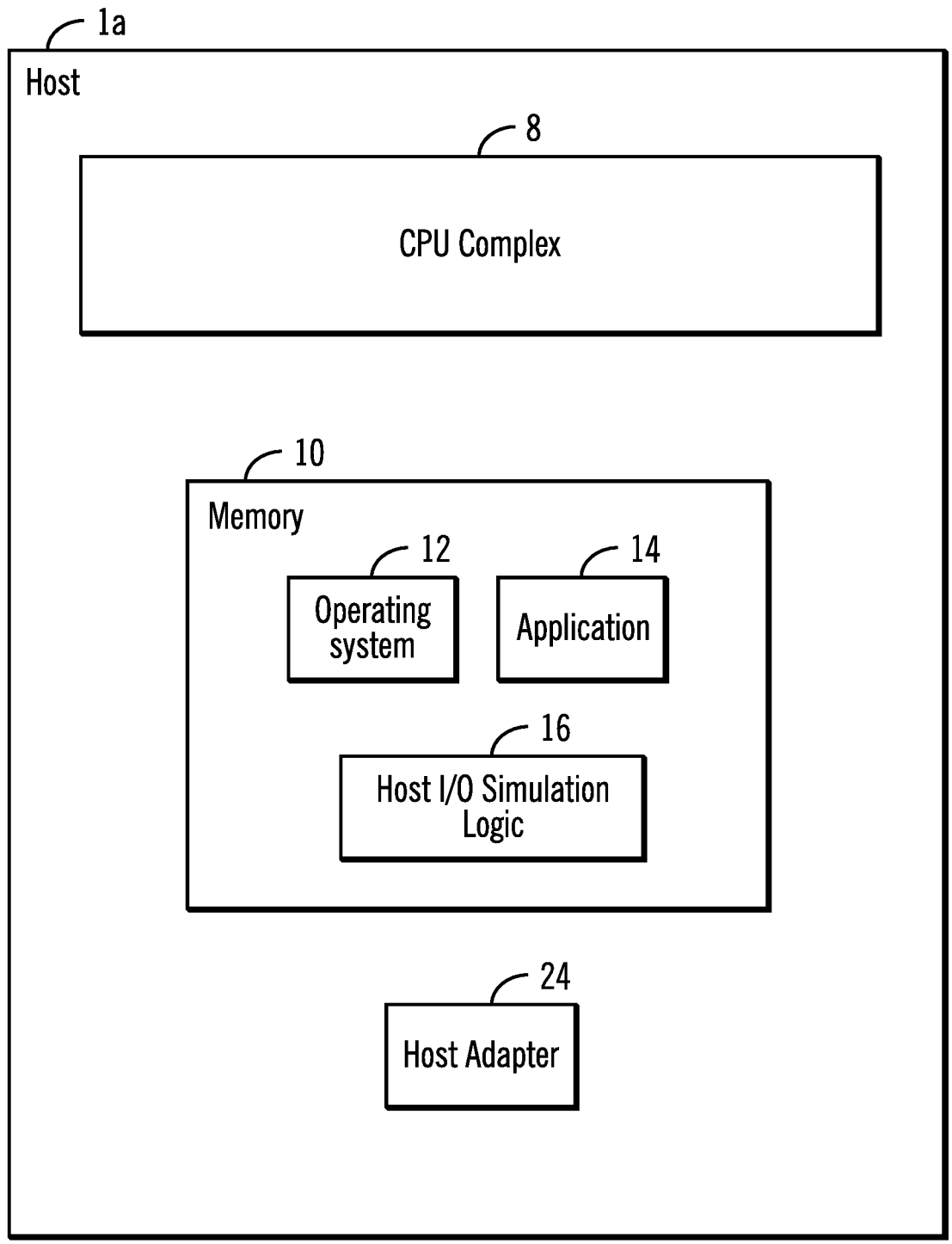
FIG. 2 illustrates an example of a host of the computing environment of FIG. 1, employing measurement of simulated mirroring in a data storage system in accordance with one aspect of the present description.
Figure 3:
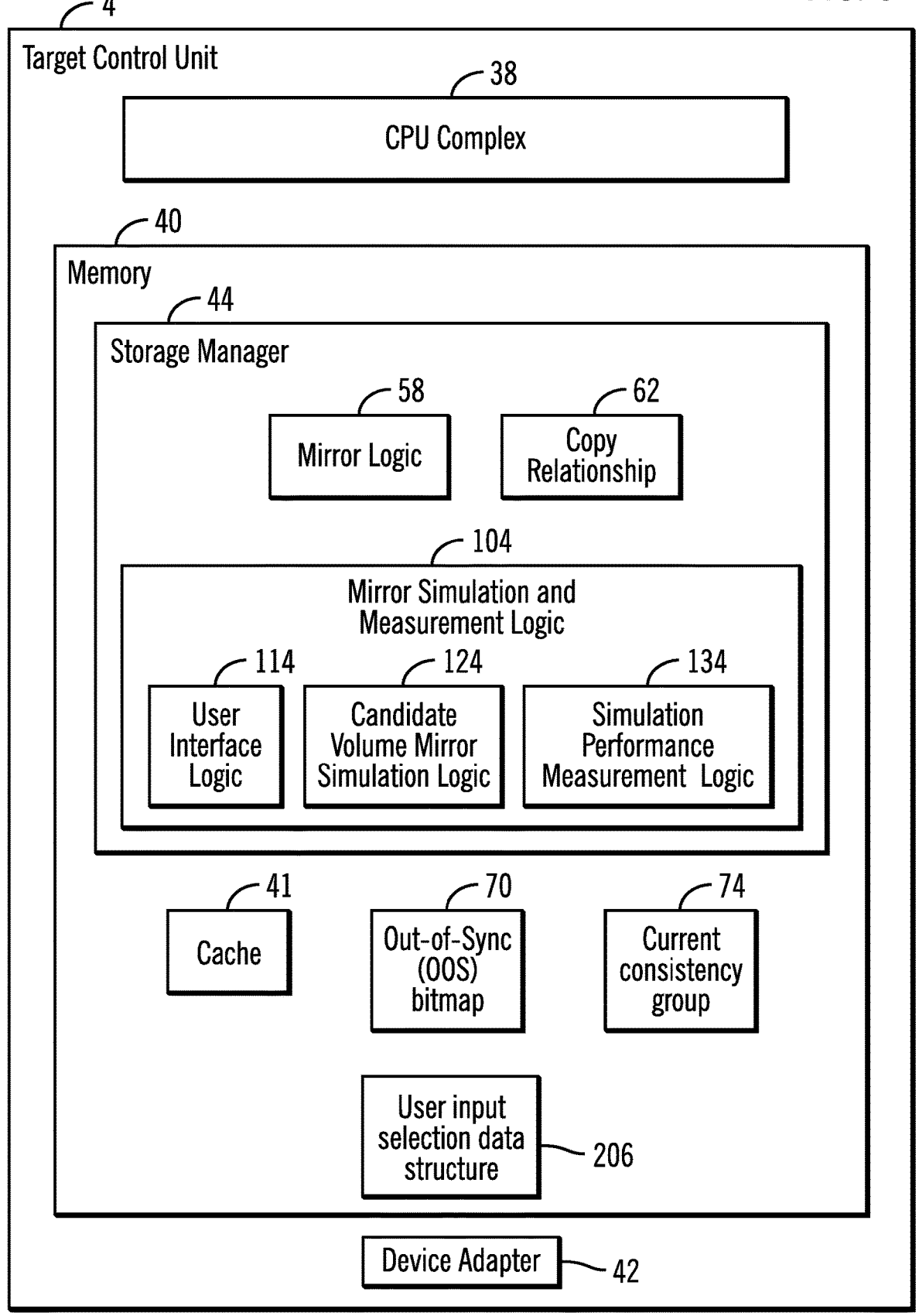
FIG. 3 illustrates an example of a storage controller of the computing environment of FIG. 1, employing measurement of simulated mirroring in accordance with one aspect of the present description.

FIGS. 1-3 illustrate an embodiment of a computing environment employing measurement of simulated mirroring in a data storage system in accordance with the present description. A plurality of hosts 1a (FIGS. 1, 2), 1b . . . 1n may submit Input/Output (I/O) requests to one or more data storage devices or systems 2a, 2b, to read or write data. Each data storage system 2a, 2b includes a storage controller or target control unit 4a, 4b, respectively, an example of which is shown in greater detail in FIG. 3 as target control unit 4, which accesses user data and metadata stored in multiple data storage units of storage 6a, 6b, respectively.

The hosts 1a, 1b . . . 1n may be separate physical devices or may be virtual devices implemented using assigned resources of partitions of a server, for example. In a similar manner, the target control units 4, 4a, 4b of the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

A typical host as represented by the host 1a of FIG. 2 includes a CPU complex 8 and a memory 10 having an operating system 12, and an application 14 that cooperate to read data from and write data updates to the storage 6a, 6b via a target control unit 4 (FIG. 3), 4a, 4b. As described in greater detail below, in one embodiment of measurement of simulated mirroring in accordance with the present description, host I/O simulation logic 16 of a host such as the host 1a, is configured to simulate I/O activity directed to the primary data storage system 2a. An example of a suitable operating system is the z/OS operating system. It is appreciated that other types of operating systems may be employed, depending upon the particular application.

The I/O requests, both actual and simulated, may be transmitted to the data storage systems 2a, 2b over a network 18 (FIG. 1) which may include one or more data links 20 and switches 22 of a connection fabric to provide a connection path through the connection fabric between a selected host 1a, 1b . . . 1n and a selected target such as a data storage system 2a, 2b. Each host 1a, 1b . . . 1n has one or more host adapters 24 (FIG. 2) which connects a host to a data link 20 of the network 18. The hosts and the data storage system 2a, 2b communicate in accordance with the Fibre Channel Protocol (FCP), FICON or any other suitable protocol.

Thus, the system components 1a (FIG. 1), 1b . . . 1n, 4 (FIG. 3), 4a, 4b, 6a, 6b, are connected to the network 18 which enables communication among these components. As noted above, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The hosts 1a, 1b . . . 1n and the target control units 4, 4a, 4b controlling storage devices 6a, 6b, may each comprise any suitable computational device including those presently known in the art, such as, a personal computer, a workstation, a server, a mainframe, a hand held computer, a palm top computer, a telephony device, a network appliance, a blade computer, a processing device, etc. The hosts 1a, 1b . . . 1n and the target control units 4, 4a, 4b may be elements in any suitable network, such as, a storage area network, a wide area network, the Internet, an intranet. In certain embodiments, hosts 1a, 1b . . . 1n and the target control units 4, 4a, 4b may be elements in a cloud computing environment.

It is appreciated that one or more data storage units of the storage 6a, 6b may comprise any suitable device capable of storing data in a nonvolatile manner, such as hard drives, solid state drives, tape drives, etc., known in the art. Thus, in one embodiment, the storage 6a, 6b may be comprised of one or more sequential access storage devices, such as hard disk drives and magnetic tape drives or may also include non-sequential access storage devices such as solid state drives (SSD), for example. Such additional devices of storage 6a, 6b may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6a, 6b may also be other types of storage such as solid state drives in a RAID configuration to facilitate data recovery in the event of loss of a solid state drive. The storage units of the storage 6a, 6b may be configured to store data in subunits of data storage such as volumes, tracks, extents, etc.

Each target control unit 4 (FIG. 3), 4a, 4b (FIG. 1) of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each target control unit 4 (FIG. 3), 4a, 4b further has a memory 40 that includes a storage manager 44 configured to manage storage operations including writing data to or reading data from a storage unit of an associated storage 6a, 6b in response to an I/O data request from a host or mirrored data from another data storage system. In the illustrated embodiment, the memory 40 includes a cache 41 which may comprise one or more of different types of memory, such as RAMs, write caches, read caches, non-volatile storage (NVS), etc. The different types of memory that comprise the cache may interoperate with each other.

Each target control unit 4 (FIG. 3), 4a, 4b has one or more device adapters 42 (FIG. 3) which connects a target control unit to a data link 20 (FIG. 1) of the network 18. The storage manager 44 includes appropriate storage device drivers to configure associated storage 6a, 6b.

The CPU complex 38 of each target control unit 4 (FIG. 3), 4a, 4b may have multiple clusters of processors, each cluster having its own assigned memory 40, storage manager 44, cache, etc. The processing and memory resources assigned each cluster may be physical, virtual, shared, transferrable or dedicated, depending upon the particular application.

In the illustrated embodiment, the storage manager 44 includes mirror logic 58 that is configured to execute in the primary target control unit 4a (FIG. 1) and perform copy operations to copy tracks or other portions of storage volumes from the primary target control unit 4a to the secondary target control unit 4b in a consistent manner. For example, a primary-secondary pair of volumes, volume1, volume2 (FIG. 1) are in an asynchronous copy or mirror relationship 62 such that updates to the primary volume1 are asynchronously mirrored to each secondary volume2.

In the illustrated embodiment, a copy relationship is represented by a data structure as represented by the copy relationships 62 of the memory 40 of FIG. 3. Thus, one or more copy relationships 62, which may be maintained by the mirror logic 58 for the primary and secondary target control units 4a, 4b, (FIG. 1) associate primary storage locations in the primary storage 6a and corresponding secondary storage locations in each of the secondary storage drives as represented by the storage 6b of the mirror relationship, such that updates to locations of the primary storage 6a are mirrored, that is, copied to the corresponding locations of the secondary storage 6b. For example, source storage locations in a primary storage volume1 (FIG. 1) of storage 6a may be asynchronously mirrored in a mirror operation to target storage locations of a secondary volume2 of the storage 6b pursuant to a mirror copy relationship 62 (FIG. 3). Similarly, source storage locations in the primary storage volume1 (FIG. 1) of storage 6a may be asynchronously mirrored in a mirror operation to additional target storage locations of another secondary volume2 of another secondary data storage system pursuant to a mirror copy relationship 62 (FIG. 3).

In the illustrated embodiment, a copy relationship of the copy relationships 62 comprises an asynchronous mirror relationship for a pair of storage locations in which updates to the primary (source) storage locations of the mirror relationship 62 are asynchronously mirrored to the secondary (target) storage locations of the mirror relationship 62. It is appreciated that other types of copy relationships such as synchronous, for example, may be established, depending upon the particular application.

In the configuration illustrated in FIG. 1, the storage controller 4a and the data storage 6a have been configured as a primary storage control unit and the primary storage, respectively, of a primary data storage system 2a. Similarly, the storage controller 4b and its data storage 6b have been configured as a secondary storage control unit and a secondary storage, respectively, of a secondary data storage system 2b. Hence, in the configuration depicted in FIG. 1, the storage controller 4a will be referred to as a primary storage controller or control unit 4a, and the data storage 6a will be referred to as a primary storage 6a. Similarly, the storage controller or control unit 4b will be referred to as a secondary storage controller or control unit 4b and the data storage 6b will be referred to as a secondary data storage 6b. In this embodiment, there may be multiple secondary data storages such that a copy relation can be in a one to many relationship, which is also referred to as a multi-target relationship.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

In the illustrated embodiment, the mirror logic 58 cooperates with an out-of-synchronization data structure such as an out-of-synchronization (OOS) bitmap 70 that indicates tracks to be copied from the primary storage controller 4a to the secondary storage controller 4b in the current formation of a consistency group 74. One mode of the mirroring may be implemented with asynchronous copy operations, such as a IBM's Global Mirror program modified as appropriate in accordance with present description. The described operations may be implemented with other programs such as other copy programs or other recovery programs modified as appropriate in accordance with present description.

In the illustrated embodiment, the bitmap 70 is a data structure maintained in the memory 40 by the mirror logic 58. In this embodiment, each bit of the OOS bitmap 70 of the memory 40 corresponds to a track of a storage volume. If a bit is determined by the mirror logic 58 to be set (e.g., is assigned to 1) then the set bit functions as a flag set to indicate that the corresponding track is to be copied by the mirror logic 58 from the primary storage controller 4a to the secondary storage controller 4b. If a bit is determined to not be set (i.e., unset or reset and is, for example, assigned to 0) then the corresponding track need not be copied by the mirror logic 58 from the primary storage controller 4a to the secondary storage controller 4b to complete a consistency group for data synchronization. In the illustrated embodiment, the current consistency group 74 is represented by a data structure which is maintained in the memory 40 by the mirror logic 58.

In one aspect of the present description, the storage manager 44 further includes mirror simulation and measurement logic 104 which is configured in one embodiment as a testing tool for mirrored environments to assist users in planning mirroring operations for the data storage systems. It is appreciated herein that there exists a need to allow a user to test their existing storage environment to predict whether a given set of volumes can be effectively mirrored between data storage systems with acceptable RPO times before committing those volumes to mirror actual customer data. In one embodiment, the mirror simulation and measurement logic 104 is configured to evaluate actual network capability in a live simulation in order to get accurate and usable results. Thus, the mirror simulation and measurement logic 104 includes a live simulator which allows a user to test their existing storage environment to predict whether a given set of volumes or other units of storage can be effectively mirrored between data storage systems with acceptable throughput, latency, time to synchronize and RPO times.

As described in greater detail below, the mirror simulation and measurement logic 104 permits the retrieval of a variety of useful and significant information for data mirror planning purposes. Such retrievable information may include, for example, estimated values for RPO times for asynchronous (also referred to as "async") mirrors, time to synchronize for both for async and synchronous (also referred to as "sync") mirrors, and I/O request latency from the viewpoint of a host.

Figure 4:
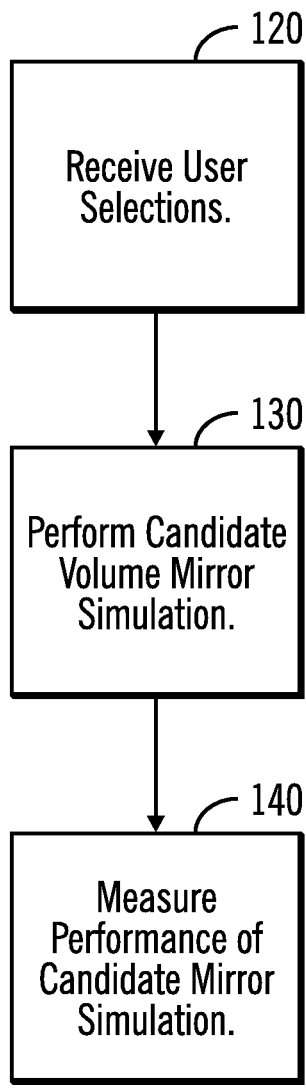
FIG. 4 illustrates an example of operations of components of the computing environment of FIG. 1, employing measurement of simulated mirroring in accordance with one aspect of the present description.

FIG. 4 depicts one example of operations of the mirror simulation and measurement logic 104 of FIG. 3. In this example, network connections have been set up over the network 18 between the primary data storage system 2a (FIG. 1) and the secondary data storage system 2b. In one operation, user interface logic 114 of the mirror simulation and measurement logic 104 is configured to receive (block 120, FIG. 4) user selections including a user selection of a candidate volume or a set of candidate volumes of a primary data storage system for mirroring to a secondary data storage system in a mirror simulation. Candidate volume mirror simulation logic 124 (FIG. 3) of the mirror simulation and measurement logic 104, is configured to simulate (block 130, FIG. 4), as a function of received user selections, writing to and mirroring from a selected candidate volume or set of volumes to the secondary data storage system in a candidate volume mirror simulation. In one embodiment, the candidate volume mirror simulation may be executed over a particular interval of time which may be user selectable through the user interface logic 114, for example.

Simulation performance measurement logic 134 (FIG. 3) of the mirror simulation and measurement logic 104, is configured to measure (block 140, FIG. 4) performance of the primary and secondary data storage systems over the course of the candidate volume mirror simulation. The results of the measurements may be provided to a user to assist in determining whether or not to initiate mirroring of the candidate volume or set of volumes, or whether system upgrades or downgrades are in order. In one embodiment, mirroring in response to measurement results provided by the mirror simulation and measurement logic 104 may be initiated automatically by the storage manager 44 or may be initiated manually by a user. In a similar manner, system upgrades or system downgrades in response to measurement results provided by the mirror simulation and measurement logic 104 may be initiated automatically by the storage manager 44 or may be initiated manually by a user. For example, bandwidth may be upgraded or downgraded automatically, depending upon the results provided by the mirror simulation and measurement logic 104.

Figure 5:
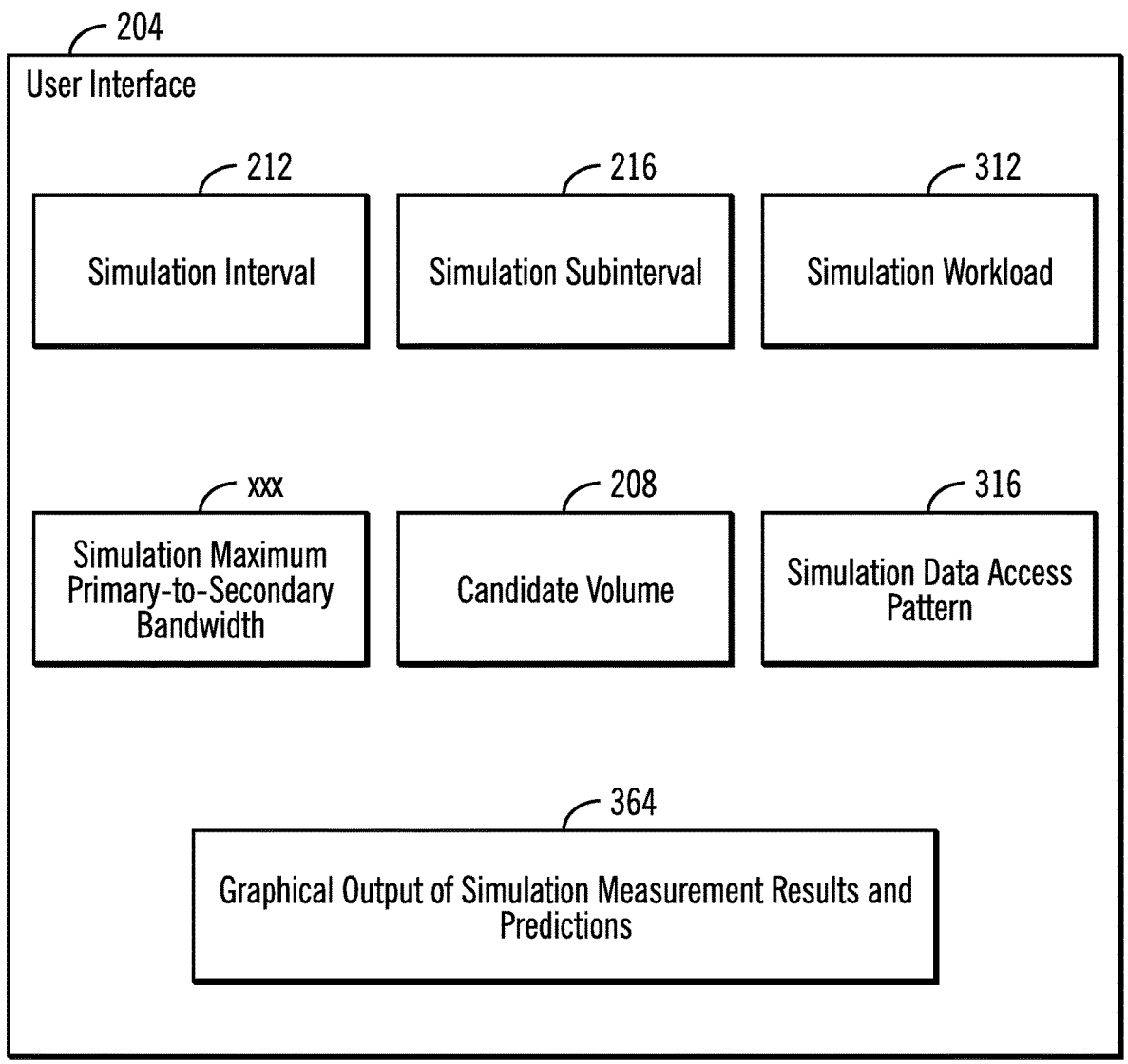
FIG. 5 illustrates an example of a user interface of the computing environment of FIG. 1 employing measurement of simulated mirroring in accordance with one aspect of the present description.

FIG. 5 shows an example of a user interface 204 of the user interface logic 114 (FIG. 3) configured to receive (block 120, FIG. 4) user selections for candidate volume mirror simulation in accordance with one embodiment of the present description. In this example, the user interface 204 may be displayed as a graphical user interface (GUI) on a display of the primary data storage system 2a, for example, and includes a plurality of input fields including a candidate volume user selection input field 208 to receive a user selection of a candidate volume or a set of candidate volumes of a primary data storage system for mirror simulation to a secondary data storage system.

User input selections input on the user selection input fields of the interface 204 may be stored in a suitable user input selection data structure 206 (FIG. 3) of the memory 40. Although various parameters of candidate volume mirror simulation in accordance with one embodiment of the present description are described as user selected inputs, it is appreciated that one or more such parameters of candidate volume mirror simulation may have stored default values in the data structure 206 for use in the absence of an overriding user selected value, or may be automatically selected by the mirror simulation and measurement logic 104 in the absence of an overriding user selected value. For example, parameters of candidate volume mirror simulation may be automatically selected based upon empirical data accumulated in current or past mirroring of actual data. In addition, it is appreciated that user-selected inputs for candidate volume mirror simulation in accordance with one embodiment of the present description may include fewer user-selected inputs or additional user-selected inputs as compared to those depicted in FIG. 5, which are provided as an example.

The user interface 204 of the illustrated embodiment further includes a simulation interval user selection input field 212 to receive a user selection of the duration of a simulation interval of time over which the candidate volume mirror simulation is to be performed. As explained in greater detail below, the simulation performance measurement logic 134 (FIG. 3) analyzes workload and network speed during the candidate volume mirror simulation over the course of the user selected simulation interval which in one embodiment, includes peak hours in which the data storage systems have the greatest workload. In a typical installation, the workload of a data storage system varies significantly over the course of a week. Accordingly, one suitable simulation interval for candidate volume mirror simulation in accordance with the present description is a week or longer. However, it is appreciated that other simulation intervals may be selected, depending upon the particular application.

The user interface 204 further includes a simulation subinterval user selection input field 216 to receive a user selection of the duration of a subunit or subinterval of the simulation interval. In one embodiment, the simulation interval may be subdivided into subintervals of time, such as subintervals of one minute each. Thus, in each minute of the simulation interval, the simulation performance measurement logic 134 (FIG. 3) analyzes performance of the candidate volume mirror simulation over the course of the user selected simulation interval. Measurements taken in each one minute subinterval may be separately analyzed or averaged, for example, or both, depending upon the particular application. It is appreciated that providing control over the granularity of the measurement of simulated mirroring can improve the accuracy and predictive value of the simulation while balancing the impact upon system resources such as processing and storage.

Another user input field of the user interface 204 is a simulation maximum primary-to-secondary bandwidth user selection input field 220 configured to receive user selection of a maximum bandwidth between the primary data storage system and the secondary data storage system. As previously noted, RPO for example, is a function of the incoming data rate to the primary data storage system versus outgoing data rate from the primary to the secondary data storage system. The outgoing data rate typically is in turn a function of the available bandwidth between the primary and secondary data storage systems. Accordingly, in one embodiment, candidate volume mirror simulation in accordance with the present description is a function of the maximum available bandwidth.

Figure 6A:
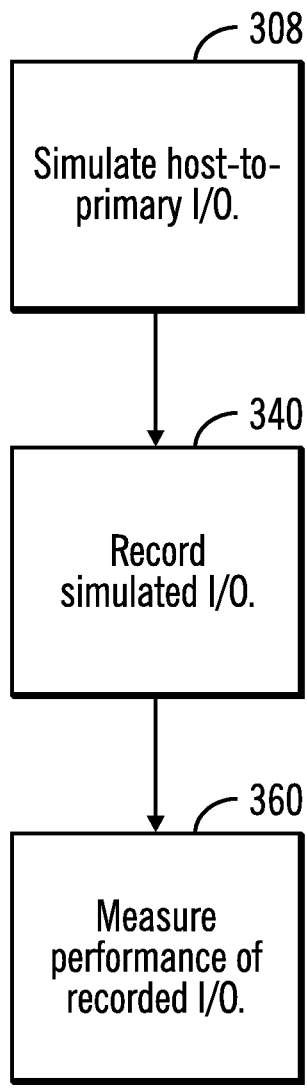
FIGS. 6a and 6b illustrate additional examples of operations of components of the computing environment of FIG. 1, employing measurement of simulated mirroring in accordance with one aspect of the present description.
Figure 6B:
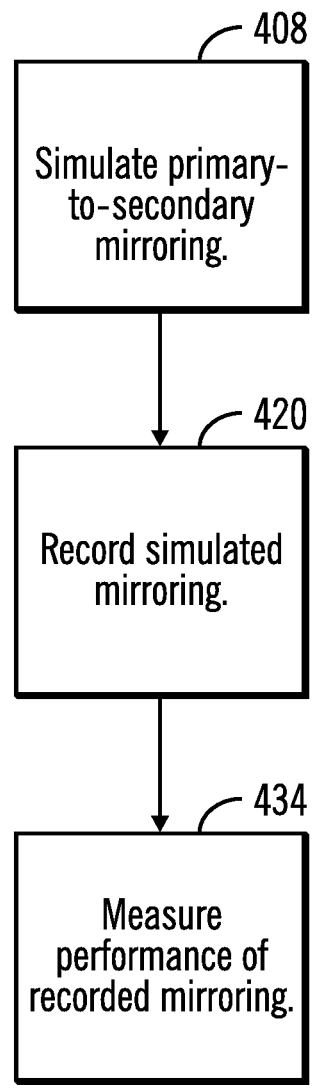
Figure 7:
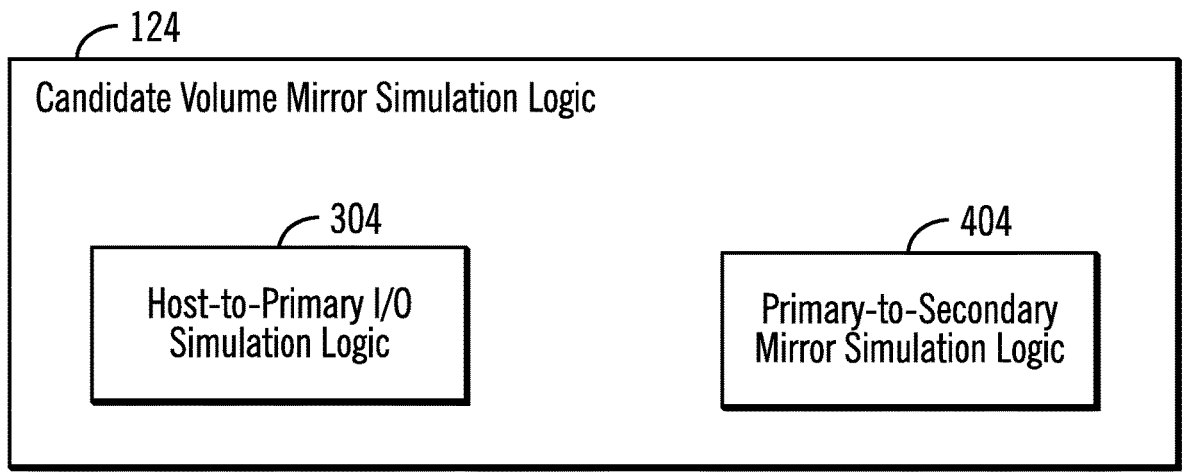
FIG. 7 illustrates an example of candidate volume mirror simulation logic of the computing environment of FIG. 1 employing measurement of simulated mirroring in accordance with one aspect of the present description.

FIGS. 6a and 6b depict an example of operations of the candidate volume mirror simulation logic 124 (FIG. 3) simulating (block 130, FIG. 4), as a function of received user selections, writing to and mirroring from a selected candidate volume or set of volumes to the secondary data storage system in a candidate volume mirror simulation. In one embodiment, host-to-primary I/O simulation logic 304 (FIG. 7) of the candidate volume mirror simulation logic 124 is configured to cause the simulation (block 308, FIG. 6a) of host-to-primary I/O directed to a user-selected candidate volume of the primary data storage system 2a (FIG. 1) over the course of a user-selected simulation interval such as one week, for example.

In one embodiment, the simulated I/O may constitute primarily write operations which write simulated write data as test write data on a user-selected candidate volume. Although read operations typically do not result in data being mirrored from a primary to secondary data storage system, it is appreciated that read operations may be included in simulated I/O operations to more closely simulate I/O operations typically performed for actual customer data.

In one embodiment, the quantity of simulated write data being directed to a candidate volume is a function of a user-selected workload value input through a simulation workload user selection input field 312 (FIG. 5) of the user interface 204. The user-selected simulation workload input value may range from light to heavy and may be expressed in megabytes or gigabytes per second, for example, depending upon the particular application. A simulation workload may be selected for a candidate volume or set of volumes based upon, for example, an expected workload for a candidate volume should the same or similar volume be subsequently employed for storage and mirroring of actual customer data rather than simulated data.

In this embodiment, the data access pattern of simulated write data being directed to a candidate volume is a function of a user-selected simulation data access pattern input through a simulation data access pattern user selection input field 316 (FIG. 5) of the user interface 204. The user-selected simulation data access pattern may be selected from various types of data access patterns typically encountered in actual customer data storage and mirroring operations such as random, sequential and repetitive data access patterns, for example, depending upon the particular application. A simulation data access pattern may be selected for a candidate volume or set of volumes based upon, for example, an expected data access pattern for a candidate volume should the same or similar volume be subsequently employed for storage and mirroring of actual customer data rather than simulated data.

Figure 8A:
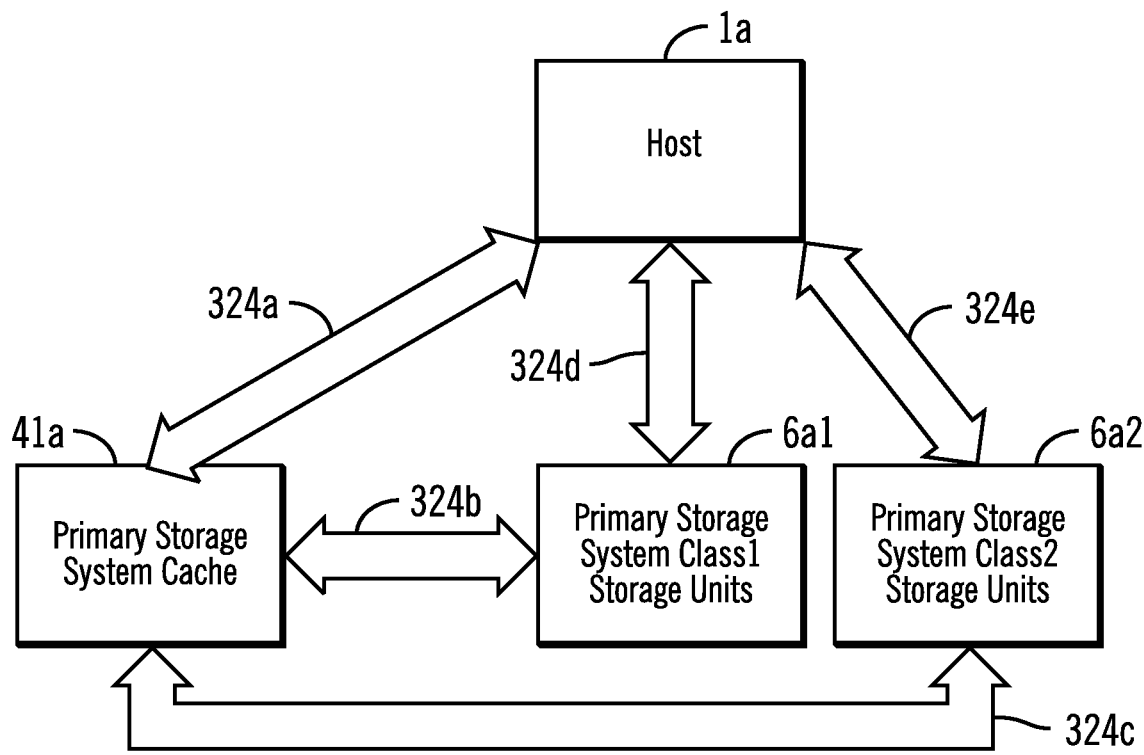
FIGS. 8a and 8b illustrate examples of data paths utilized by the candidate volume mirror simulation logic of FIG. 7 employing measurement of simulated mirroring in accordance with one aspect of the present description.
Figure 8B:
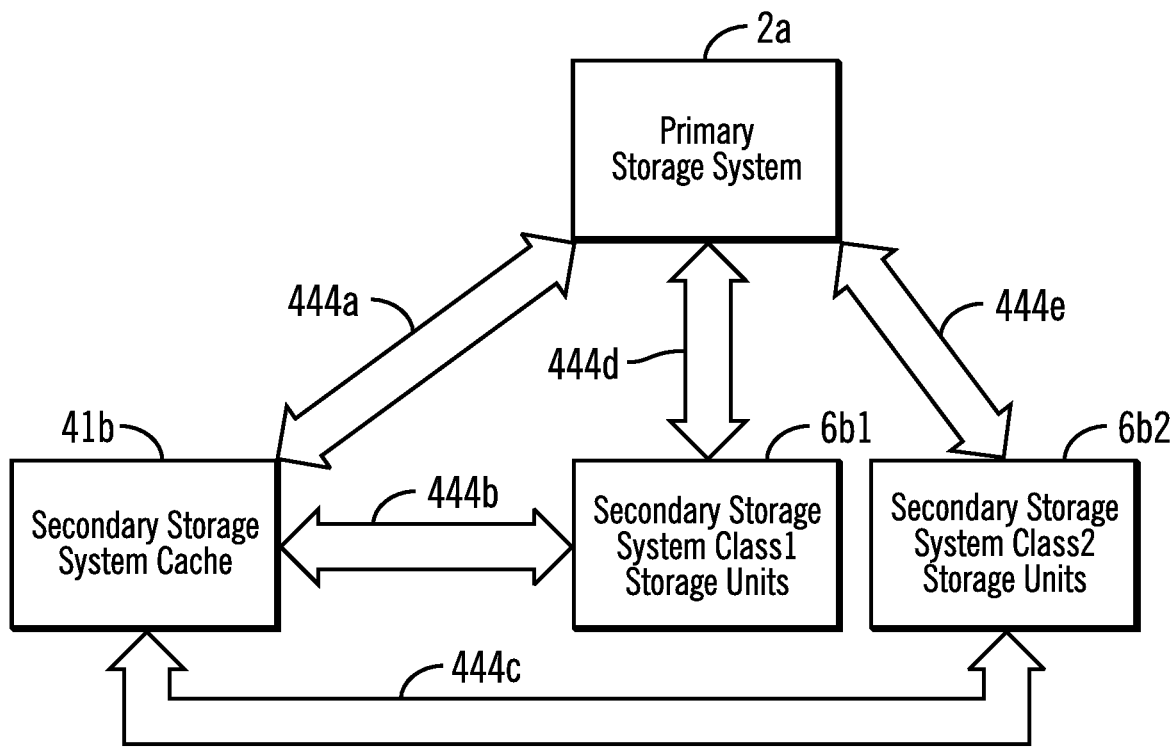

FIG. 8a depicts one example of various data paths (as represented by arrows) through which host-to-primary I/O simulation logic 304 (FIG. 7) of the candidate volume mirror simulation logic 124 causes the simulation (block 308, FIG. 6a) of host-to-primary I/O directed to a user-selected candidate volume of the primary data storage system 2a (FIG. 1) over the course of a user-selected simulation interval such as one week, for example. In this example, the primary storage 6a (FIG. 3) of the primary data storage system 2a includes multiple classes of storage units as represented by a class 1 of storage units 6a1 (FIG. 8a) which are capable of relatively fast I/O operations, and a class 2 of storage units 6a2 which are capable of relatively slower I/O operations. Thus, class 1 storage units may include, for example, solid state drives, and class 2 storage units may include slower drives such as hard drives or tape drives, for example. In a similar manner, the secondary storage 6b (FIG. 3) of the secondary data storage system 2b includes multiple classes of storage units as represented by a class 1 of storage units 6b1 (FIG. 8b) which are capable of relatively fast I/O operations, and a class 2 of storage units 6b2 which are capable of relatively slower I/O operations. Although the embodiments of FIGS. 8a and 8b depict two classes of storage units, it is appreciated that a data storage system may have fewer or greater numbers of classes of storage units, depending upon the particular application.

A volume in a data storage system may have a portion of its data stored in the class 1 storage units 6a1 and a portion of its data stored in the class 2 storage units 6a2, depending upon various factors such as the frequency of I/O operations directed to various portions of the volume, for example. In a similar manner, the portions of a candidate volume which are more frequently accessed by the simulated I/O operations of the host-to-primary I/O simulation logic 304 (FIG. 7) may be stored in the class 1 storage units 6a1 whereas the portions of a candidate volume which are less frequently accessed by the simulated I/O operations of the host-to-primary I/O simulation logic 304 (FIG. 7) may be stored in the class 2 storage units 6a2.

As noted above, in one embodiment, the data access pattern of simulated write data being directed to a candidate volume is a function of a user-selected simulation data access pattern input through a simulation data access pattern user selection input field 316 (FIG. 5) of the user interface 204. In addition to the random, sequential and repetitive data access patterns, discussed above, the user-selected simulation data access pattern may also include selections of the class or classes of storage units to which the simulated data is to be directed. For example, the user-selected simulation data access pattern may specify that a certain percentage of the simulated host-to-primary I/O operations for a candidate volume are to be relatively frequent so as to be directed to class 1 storage units 6a1, and another percentage of the simulated I/O operations for a candidate volume are to be relatively infrequent so as to be directed to class 2 storage units 6a2.

As shown in FIG. 8a, simulation write data being directed to the class 1 storage unit 6a1 and class 2 storage unit 6a2 may first be cached in a cache 41a as represented by a data path 324a before being destaged to the class 1 storage unit 6a1 as represented by a data path 324b or destaged to the class 2 storage unit 6a2 as represented by a data path 324c. If there is sufficient available space in the cache 41a for the simulation write data to be immediately cached in the cache 41a, the simulated I/O write operation is characterized as a "cache hit". Alternatively, if there is not sufficient available space in the cache 41a for the simulation write data to be immediately cached in the cache 41a, the simulated I/O write operation is characterized as a "cache wait" until sufficient data is destaged from the cache 41a to the appropriate storage unit 6a1, 6a2, to make room for the additional simulation write data.

In the illustrated embodiment, simulation write data may be written directly to the class 1 storage unit 6a1 as represented by a data path 324d, bypassing the cache 41a. Similarly, simulation write data may be written directly to the class 2 storage unit 6a2 as represented by a data path 324e, again bypassing the cache 41a. In addition to the data access patterns discussed above, the user-selected simulation data access pattern may also include selections of the data paths to various components of the primary data storage system 2a (FIG. 1). For example, the user-selected simulation data access pattern may specify that a certain percentage of the simulated host-to-primary I/O operations for a candidate volume are to be cached in the cache 41a or are to be written directly to the storage units 6a1, 6a2, bypassing the cache 41a, as shown in FIG. 8a.

In one embodiment, the host-to-primary I/O simulation logic 304 (FIG. 7) of the candidate volume mirror simulation logic 124 causes the host I/O simulation logic 16 (FIG. 2) of a host such as the host 1a, to generate simulation I/O requests and simulation test write data and direct the simulation requests and data from a host 1a to the primary data storage system 2a as described above in connection with FIGS. 4-8a. In another embodiment, the host-to-primary I/O simulation logic 304 (FIG. 7) of the candidate volume mirror simulation logic 124 generates locally within the primary data storage system 2a, simulation I/O requests and simulation test write data to simulate a host directing simulation requests and data from a host to the primary data storage system 2a as described above in connection with FIGS. 4-8a. In yet another embodiment, generation of simulation I/O requests or simulation test write data may be shared by a host and the primary data storage system to simulate direction of simulation I/O requests and simulation data from a host 1a to the primary data storage system 2a as described above in connection with FIGS. 4-8a.

Figure 9:
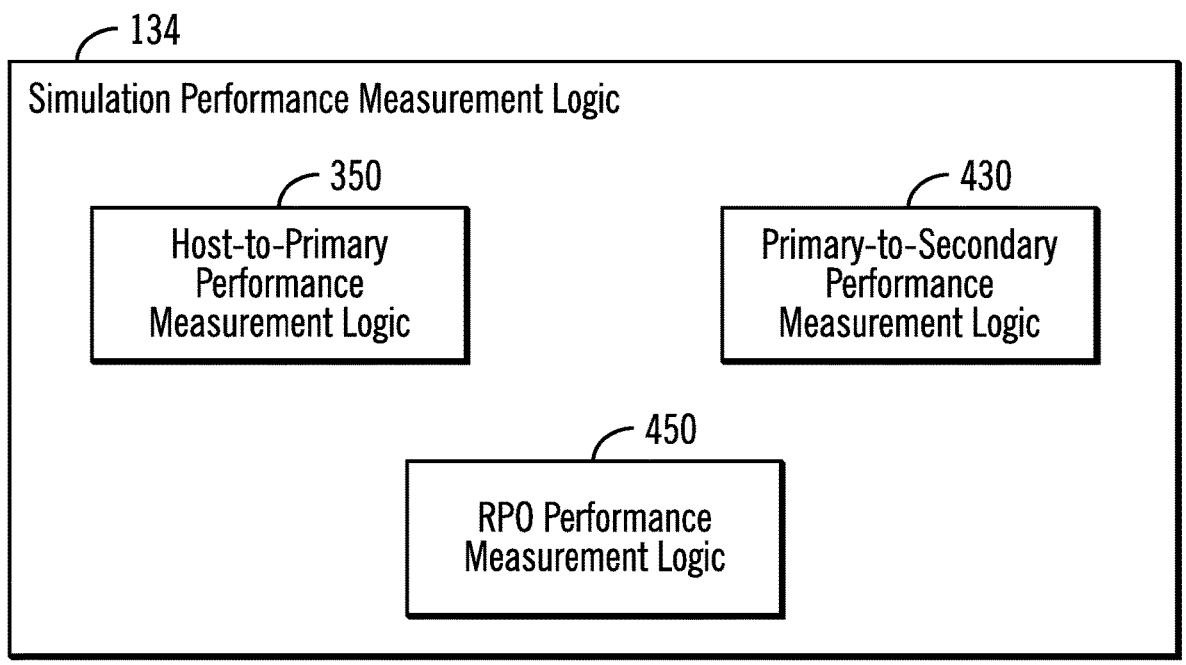
FIG. 9 illustrates an example of simulation performance measurement logic of the computing environment of FIG. 1 employing measurement of simulated mirroring in accordance with one aspect of the present description.

The simulation (block 308, FIG. 6a) of host-to-primary I/O directed to a user-selected candidate volume of the primary data storage system 2a (FIG. 1) as described above in connection with FIGS. 4-8a, is recorded (block 340, FIG. 6a) over the course of a user-selected simulation interval such as one week, for example, by host-to-primary performance measurement logic 350 (FIG. 9) of the simulation performance measurement logic 134 (FIGS. 3, 9). The host-to-primary performance measurement logic 350 is further configured to measure (block 360, FIG. 6a) the performance of the recorded simulation I/O activity. In one embodiment, recordings and measurements may be taken at each of one minute subintervals, for example, of an overall one week interval, for example, to provide one minute subintervals of record and measurement data. Thus, the candidate volume mirror simulation of this embodiment includes recording input/output (I/O) activity directed to at least one candidate primary volume of the primary data storage system 2a over each subinterval of time and measuring current host-to-primary performance of I/O activity recorded over each subinterval of time. For each subinterval of time of the simulation interval, the cache hit versus cache wait ratio over data path 324a of the simulation I/O activity, and the latency and throughput of the simulation I/O activity over each data path 324a-324e may be recorded and measured by the host-to-primary performance measure logic 350 (FIG. 9). The individual measurements over each data path 324a-324e may be accumulated to provide overall measurements of the cache hit versus cache wait ratio, latency and throughput of the simulation I/O activity directed to the candidate volume or set of volumes.

Figure 10A:
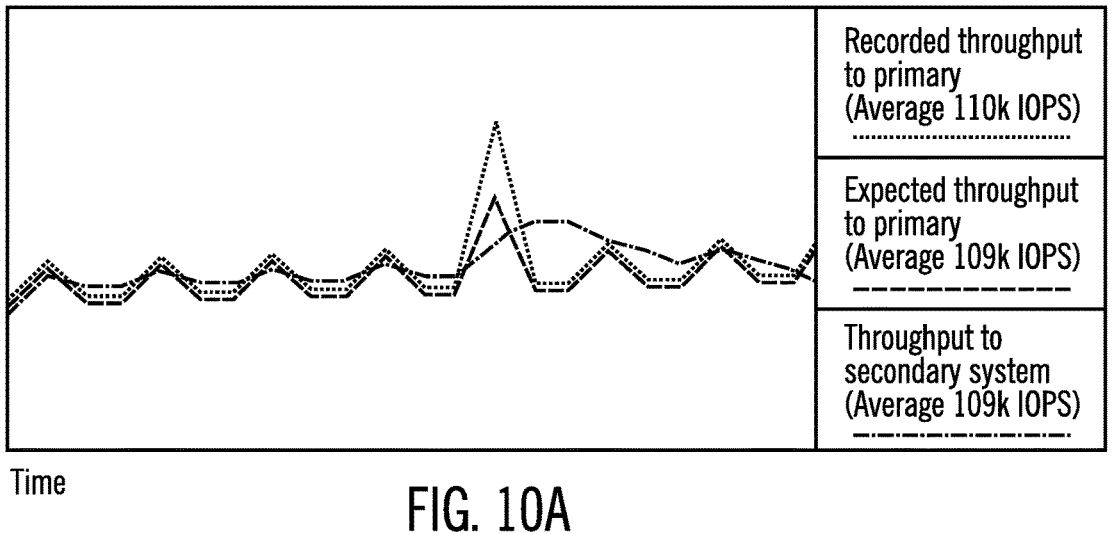
FIGS. 10*a*-10*c* depict example graphs of performance measurements output by the simulation performance measurement logic of FIG. 9.

In one embodiment, the user interface 204 (FIG. 5) includes a graphical output 364 of simulation measurement results and predictions. For example, FIG. 10a depicts an example of a graph of a recorded overall host-to-primary throughput of the simulation over all the data paths 324a-324e and measured in gigabytes of data per second (GBPS) for each subinterval of the user-selected interval of one week, for example. The host-to-primary performance measurement logic 350 is further configured to calculate and display, as a function of, that is, based upon, the recorded and measured current overall host-to-primary throughput of the candidate volume mirror simulation, an expected overall host-to-primary throughput to the candidate volume should the mirroring of the candidate volume (or similar volume) be initiated with actual customer data. As shown in the graph of FIG. 10a, the expected overall host-to-primary throughput is calculated conservatively to be slightly less (such as 1 percent less, for example) than the measured current host-to-primary throughput of the candidate volume mirror simulation, over the course of the simulation interval.

The host-to-primary performance measurement logic 350 is further configured to calculate and display an average of the recorded and measured current overall host-to-primary throughput of the candidate volume mirror simulation. In one embodiment, the average of measured current overall host-to-primary throughput of the candidate volume mirror simulation may be expressed in terms of I/O operations per second (TOPS), which is 110 k IOPS in this example. In a similar manner, the host-to-primary performance measurement logic 350 is further configured to calculate and display an average of expected host-to-primary overall throughput of the candidate volume mirror simulation, which is 109 k IOPS in this example.

Figure 10B:
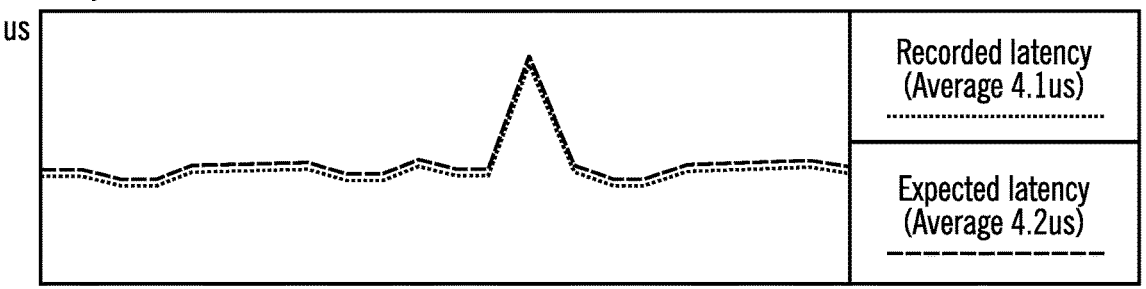

As previously mentioned, another metric of data storage performance is latency which measures the delay between a host issuing an input/output instruction or command, and receipt by the host that the instruction has been successfully completed. As shown in FIG. 10b, the host-to-primary performance measurement logic 350 is further configured to calculate and display a graph of overall I/O simulation latency measured in microseconds based upon the recorded I/O simulation activity of the candidate volume mirror simulation, over the user-selected interval of one week, for example. Thus, FIG. 10b depicts an example of a graph of a recorded overall current host-to-primary latency of the simulation measured over each of the data paths 324a-324e and measured in microseconds for each subinterval of the user-selected interval of one week, for example.

Configurations of the host-to-primary performance measurement logic 350 further include a configuration for calculating and displaying an expected overall host-to-primary latency should the mirroring of the candidate volume (or similar volume) be initiated with actual customer data. The expected overall host-to-primary latency is conservatively based upon, that is a function of, the recorded and measured current overall host-to-primary latency of the candidate volume mirror simulation. In addition, averages of the current and expected host-to-primary latencies may be calculated and displayed as well. In this example, the recorded host-to-primary overall latency has an average of 4.1 microseconds and the expected host-to-primary overall latency has a slightly longer (such as 1 percent longer, for example) average of 4.2 microseconds.

As previously mentioned, FIG. 6a depicts an example of operations of the candidate volume mirror simulation logic 124 (FIG. 3) simulating (block 130, FIG. 4), as a function of received user selections, I/O operations writing to a selected candidate volume or set of volumes in a candidate volume mirror simulation. More specifically, host-to-primary I/O simulation logic 304 (FIG. 7) of the candidate volume mirror simulation logic 124 causes the simulation (block 308, FIG. 6a) of host-to-primary I/O directed to a user-selected candidate volume of the primary data storage system 2a (FIG. 1) over the course of a user-selected simulation interval such as one week, for example. FIG. 6b depicts an example of operations of the candidate volume mirror simulation logic 124 (FIG. 3) simulating (block 130, FIG. 4), the mirroring of the data written to a selected candidate volume or set of volumes, to the secondary data storage system in a candidate volume mirror simulation. In one embodiment, primary-to-secondary I/O simulation logic 404 (FIG. 7) of the candidate volume mirror simulation logic 124 is configured to cause the simulation (block 408, FIG. 6b) of primary-to-secondary mirroring from a user-selected candidate volume of the primary data storage system 2a (FIG. 1) over the course of the same user-selected simulation interval such as one week, for example.

In one embodiment, the primary-to-secondary I/O simulation logic 404 (FIG. 7) of the candidate volume mirror simulation logic 124 is configured to cause the mirror logic 58 (FIG. 3) to mirror the simulation write data which was written in simulation I/O operations by the host-to-primary I/O simulation logic 304 (FIG. 7), from the user-selected candidate volume or set of candidate volumes to the secondary data storage system 2b. (FIG. 1). Accordingly, the mirrored simulation data is recorded (block 420, FIG. 6b) over the course of a user-selected simulation interval such as one week, for example, by primary-to-secondary performance measurement logic 430 (FIG. 9) of the simulation performance measurement logic 134 (FIGS. 3, 9) in a manner similar to that described above for the recordation (block 340, FIG. 6a) of host-to-primary I/O directed to a user-selected candidate volume of the primary data storage system 2a (FIG. 1).

The primary-to-secondary performance measurement logic 430 (FIG. 9) is further configured to measure (block 434, FIG. 6b) the performance of the recorded simulation mirror activity in a manner similar to the measurement (block 360, FIG. 6a) of the performance of the recorded simulation I/O activity. Thus, here too, recordings and measurements of the simulated mirror activity over the various data paths 444a-444e (FIG. 8b) of the secondary data storage system 2b, may be taken at each subinterval of the overall interval such as subintervals of one minute each to provide one minute subintervals of recorded and measured mirror simulation data. Thus, the candidate volume mirror simulation of this embodiment includes recording mirror activity directed from at least one candidate primary volume of the primary data storage system 2a to the secondary data storage system 2b over each subinterval of time and measuring current primary-to-secondary mirror activity recorded over each subinterval of time. For each subinterval of time of the simulation interval, the cache hit versus cache wait ratio over data path 444a of the simulation mirroring activity, and the latency and throughput of the simulation mirroring activity over each data path 444a-444e may be measured and recorded by the primary-to-secondary performance measurement logic 430 (FIG. 9). The individual measurements over each data path 444a-444e may be accumulated over the user-selected interval of one week, for example, to provide overall measurements of the cache hit versus cache wait ratio, latency and throughput of the simulation mirroring activity mirrored from the candidate volume or set of volumes. The overall throughput and latency of the recorded primary-to-secondary mirror activity may be calculated and output in a manner similar to that described above for host-to-primary I/O simulation as depicted in the graphs of FIGS. 10a and 10b. For example, FIG. 10a depicts a graph of overall primary-to-secondary mirror simulation throughput to the secondary data storage system 2b as recorded and measured over the overall (e.g. one-week) simulation interval.

In another aspect of measurement of simulated mirroring in accordance with the present description, instead of mirroring to the secondary data storage system 2b all the simulation write data directed to the candidate volume or volumes of the primary data storage system 2a, primary-to-secondary I/O simulation logic 404 (FIG. 7) of the candidate volume mirror simulation logic 124 may be configured to send test packets of test data to the secondary data storage system 2b to measure latency. FIG. 8b depicts one example of various data paths represented by arrows through which primary-to-secondary mirror simulation logic 404 (FIG. 7) of the candidate volume mirror simulation logic 124 causes the simulation (block 408, FIG. 6b) of primary-to-secondary mirroring from a user-selected candidate volume of the primary data storage system 2a (FIG. 1) to the secondary data storage system 2b over the course of a user-selected simulation interval such as one week, for example. In this example, the secondary storage 6b of the secondary data storage system 2b, like the primary storage 6a (FIG. 3) of the primary data storage system 2a includes multiple classes of storage units as represented by a class 1 of storage units 6b1 (FIG. 8b) which are capable of relatively fast I/O operations, and a class 2 of storage units 6b2 which are capable of relatively slower I/O operations.

Thus, in one embodiment, the primary-to-secondary I/O simulation logic 404 (FIG. 7) of the candidate volume mirror simulation logic 124 is configured to cause the simulation (block 408, FIG. 6b) of primary-to-secondary mirroring from a user-selected candidate volume of the primary data storage system 2a (FIG. 1) by sending test packets each subinterval over the course of the same user-selected one week simulation interval. As shown in FIG. 8b, simulation mirror test packets being directed to the class 1 storage unit 6b1 and class 2 storage unit 6b2 may first be cached in a cache 41b as represented by a data path 444a before being destaged to the class 1 storage unit 6b1 as represented by a data path 444b or destaged to the class 2 storage unit 6a2 as represented by a data path 444c. In a manner similar to the simulated I/O activity described above in connection with FIG. 8a A test packet may be written directly to the class 1 storage unit 6b1 as represented by a data path 444d, bypassing the cache 41b. Similarly, a simulation test packet may be written directly to the class 2 storage unit 6b2 as represented by a data path 444e, again bypassing the cache 41b.

Each time a test packet is cached in the secondary system cache 41b, or destaged to a storage unit 6b1 or 6b2, or stored directly in a storage unit 6b1 or 6b2. a completion message is returned to the primary data storage system 2a. The primary-to-secondary performance measurement logic 430 (FIG. 9) is further configured to receive each test packet completion message and calculate for the associated data path, the primary-to-secondary test packet latency for the associated data path.

In this manner, a primary-to-secondary mirror latency may be measured based upon test packet latency, for each data path 444a-444e in each one minute simulation subinterval of the one week simulation interval. An overall primary-to-secondary mirror latency for the primary-to-secondary mirror simulation considered as a whole, may be determined as a function of the primary-to-secondary mirror latency measured for each data path 444a-444e using test packets sent in each one minute simulation subinterval of the one week simulation interval. Similar to the graph of FIG. 10b for the recorded and expected overall latency of the host-to-primary I/O simulation, a graph of the estimated and expected overall primary-to-secondary mirror latency measured in microseconds for each subinterval of the user-selected interval of one week, may be output as well.

Based upon the primary-to-secondary mirror test packet latency measured in each one minute subinterval for each data path 444a-444e of the secondary data storage system 2b, and based upon host-to-primary I/O simulation throughput and cache hit versus cache wait ratio measured in each one minute subinterval for each data path 324a-324e (FIG. 8a) of the host-to-primary I/O simulation, an estimated primary-to-secondary simulated mirror throughput may be calculated for each data path 444a-444e of the secondary data storage system 2b, for each one minute subinterval of the one week simulation interval. For example, should mirror latency increase due to an increase in network congestion between the primary data storage system 2a and the secondary data storage system 2b, or due to a processing slow down caused by increased workload in the secondary storage system, for example, primary-to-secondary mirror throughput may slow as well. Accordingly, an estimated primary-to-secondary mirror throughput based upon a measured host-to-primary I/O throughput, may be reduced compared to that of the measured host-to-primary throughput. In addition, an expected overall primary-to-secondary mirror throughput may be conservatively calculated for the primary-to-secondary mirror simulation based upon the estimated mirror throughput for each data path 444a-444e in each one minute simulation subinterval should mirroring of actual customer data be initiated for the candidate volume or set of volumes. Thus, a graph similar to the mirror throughput to secondary graph of FIG. 10a, may be determined and output to depict estimated or expected overall primary-to-secondary mirror simulation throughput for the secondary data storage system 2b as a whole, for the course of a one week simulation interval.

It is appreciated that mirror throughput to the secondary data storage system 2b is a function of the available bandwidth between the primary and secondary data storage systems 2a, 2b. Accordingly, the estimated or expected overall primary-to-secondary mirror simulation throughput for the secondary data storage system 2b when combined with the mirror throughput of the actual customer data being mirrored over the course of the interval cannot exceed the available bandwidth between the primary and secondary data storage systems 2a, 2b. As noted above, the user interface 204 includes a maximum primary-to-secondary bandwidth user selection input field 220 configured to receive user selection of a maximum bandwidth between the primary data storage system and the secondary data storage system. Accordingly, in one embodiment, candidate volume mirror simulation in accordance with the present description is also a function of the maximum available bandwidth.

As previously mentioned, RPO is an indication of how far behind a secondary storage site is with respect to data from a primary storage site due to transmission delays and other factors such as processing delays at the secondary storage system. The higher the RPO the longer it can take for the system to recover at the secondary site from a disaster at the primary site. It is not uncommon that every minute operations are down or not fully recovered, can cause significant financial loss.

As a simplification, RPO can be thought of as a measure of the incoming data rate to the primary site versus outgoing data rate from the primary site to the secondary site. Thus, in one embodiment, the simulation performance measurement logic 134 (FIG. 9) includes RPO performance measurement logic 450 which is configured determine a current recovery point objective (RPO) for each one minute subinterval of time and an average current RPO for the one week interval based upon an average of the determined recovery point objective (RPO) for each one minute subinterval of time of the one week interval of time of the simulation. For example, the difference between the recorded host-to-primary throughput and the recorded or estimated primary-to-secondary throughput of FIG. 10a may be determined for each one minute subinterval of the one week candidate volume mirror simulation.

Figure 10C:
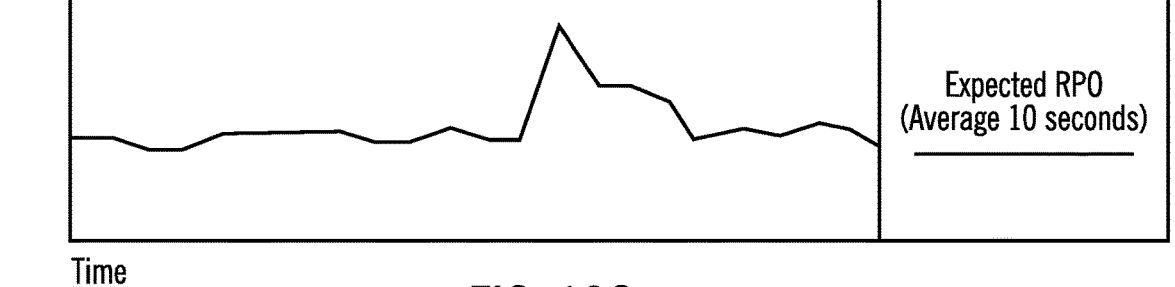

The RPO performance measurement logic 450 is further configured to calculate and display, based upon the current recovery point objective (RPO) measured for each one minute subinterval of time for the one week interval of the simulation, an expected overall recovery point objective (RPO) for the candidate volume should the mirroring of the candidate volume (or similar volume) be initiated with actual customer data. In the example of graph of FIG. 10c, the expected overall recovery point objective (RPO) is calculated conservatively to be slightly longer (such as 1 percent longer, for example) than the measured current recovery point objective (RPO) of the candidate volume mirror simulation, over the course of the simulation interval.

The RPO performance measurement logic 450 is further configured to calculate and display, based upon the current recovery point objective (RPO) and the expected recovery point objective (RPO determined for each one minute subinterval of time for the one week interval of the simulation, an average overall current and an average overall expected recovery point objective (RPO) for the candidate volume should the mirroring of the candidate volume (or similar volume) be initiated with actual customer data. In the embodiment, of FIG. 10c, the average of the expected RPO for the candidate volume is conservatively determined to be ten seconds over the course of the one week interval of simulation.

In embodiments in which simulation write data written to the primary in the host-to-primary I/O simulation, is mirrored from the primary data storage system to the secondary data storage system, RPO may also be determined by monitoring the number of tracks indicated by the OOS bitmap 70 as remaining to be mirrored over to the secondary data storage system. As previously mentioned, the OOS bitmap 70 is a data structure maintained in the memory 40 by the mirror logic 58. In this embodiment, each bit of the OOS bitmap 70 of the memory 40 corresponds to a track of a storage volume. If a bit is to be set (e.g., is assigned to 1) then the set bit functions as a flag set to indicate that the corresponding track is to be copied by the mirror logic 58 from the primary storage controller 4a to the secondary storage controller 4b.

Accordingly, RPO may be determined for each one minute subinterval of the simulation by monitoring the number of bits set in the OOS bitmap 70 in each one minute subinterval and multiplying the number of set bits in the one minute subinterval by the latency measured for that subinterval in the primary-to-secondary mirror simulation as described above. The number of set bits in the OOS bitmap 70 in any one subinterval may be the number of set bits present at a particular instant within the one minute subinterval or may be an average of the set bits present over the course of the one minute subinterval, for example. An expected and averages of the current and expected RPO over the course of the one week interval of candidate volume mirror simulation may be determined as well in the manner described above.

Another metric of data storage performance is time to synchronize (or time to sync) which measures the total time to copy a primary volume in its entirety to a secondary volume. Like RPO and latency, time to sync is affected by transmission delays and other factors such as processing delays at the secondary storage system. The longer the time to sync, the longer it can take for the system to recover at the secondary site from a disaster at the primary site.

In one embodiment, the primary-to-secondary performance measurement logic 430 (FIG. 9) of the simulation performance measurement logic 134 is configured determine for the candidate volume, a current time to sync value for each subinterval of the simulation and an average current time to sync for the one week interval based upon an average of the determined time to sync for each subinterval of time of the one week interval of time of the simulation. The RPO performance measurement logic 450 is further configured to calculate and display, based upon the current time to sync measured for each subinterval of the one week interval of the simulation, an expected overall time to sync for the candidate volume should the mirroring of the candidate volume (or similar volume) be initiated with actual customer data. The expected overall time to sync may be calculated conservatively to be slightly longer (such as 1 percent longer, for example) than the measured current time to sync of the candidate volume mirror simulation, over the course of the simulation interval. The primary-to-secondary performance measurement logic 430 (FIG. 9) is further configured to calculate and display, based upon the current time to sync and the expected time to sync determined for each one minute subinterval of time for the one week interval of the simulation, an average overall current time to sync and an average overall expected time to sync for the candidate volume should the mirroring of the candidate volume (or similar volume) be initiated with actual customer data.

In embodiments in which simulation write data written to the primary in the host-to-primary I/O simulation, is mirrored from the primary data storage system to the secondary data storage system, time to sync may be determined for example, by monitoring the total number of tracks indicated by the OOS bitmap 70 for the candidate volume and multiplying the total number of tracks indicated by the OOS bitmap 70 for the candidate volume by the latency measured for that subinterval in the primary-to-secondary mirror simulation as described above. An expected time to sync and averages of the current and expected time to sync over the course of the one week interval of candidate volume mirror simulation may be determined and output as well in the manner described above.

In the illustrated embodiment, the storage manager 44 including the mirror simulation and measurement logic 104 is depicted as software stored in the memory 40 and executed by the CPU complex 38. However, it is appreciated that the logic functions of the storage manager 44 may be implemented as hardware, software, firmware or combinations of one or more thereof, depending upon the particular application.

The storage manager 44 (FIG. 3) in one embodiment stores data in the cache and transfers data between the cache and storage 6a, 6b (FIG. 1) in tracks. Similarly, the storage manager 44 (FIG. 3) in one embodiment transfers data from the primary storage 6a (FIG. a) to a secondary storage 6b in tracks. As used herein in one embodiment, the term track refers to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in input/output operations in accordance with the present description may vary, depending upon the particular application. Thus, as used herein, the term "track" or the term "segment" refers to any suitable subunit of data storage or transfer.

Figure 11:
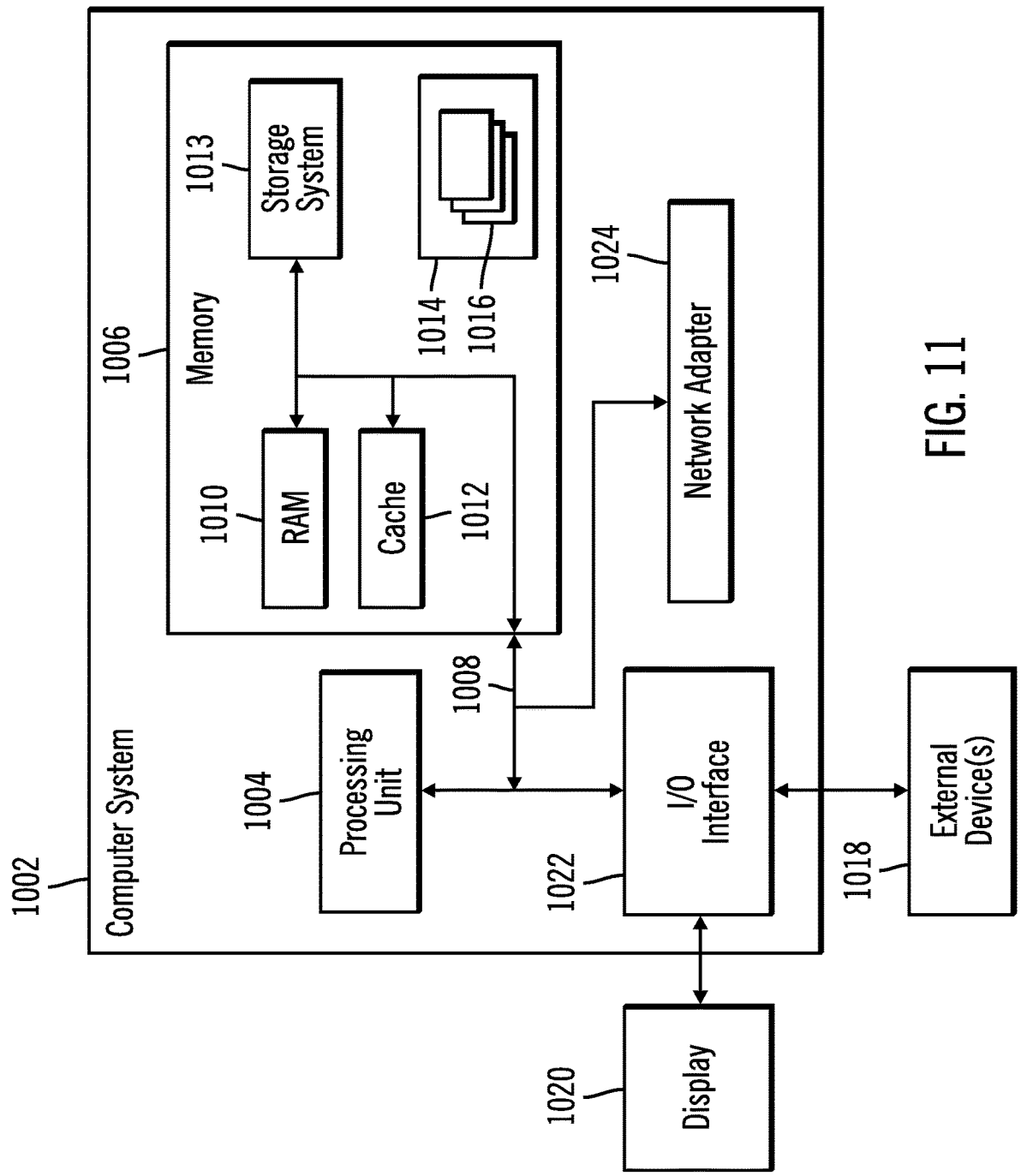
FIG. 11 illustrates a computer embodiment employing measurement of simulated mirroring in a data storage system in accordance with the present description.

The computational components of the figures may each be implemented in one or more computer systems, such as the computer system 1002 shown in FIG. 11. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a host, and a primary data storage system and a secondary data storage system wherein the primary data storage system has a storage controller and at least one storage unit controlled by the storage controller and configured to store host data in a primary volume, wherein the storage controller has a processor and a cache, and wherein the computer program product comprises a computer readable storage medium having program instructions embodied therewith, the program instructions executable by a processor of the storage controller to cause storage controller processor operations, the storage controller processor operations comprising: receiving user selections including a user selection of a candidate volume of the at least one storage unit of the primary data storage system for mirroring to a secondary data storage system; simulating as a function of received user selections, mirroring of a selected candidate volume written directly to the secondary data storage system in a candidate volume mirror simulation over a first interval of time; and measuring performance of the candidate volume mirror simulation.

2. The computer program product of claim 1 wherein the primary data storage system further has a user interface and wherein the storage controller processor operations further comprise:
receiving the user selections through the user interface of the primary data storage system wherein the user selections include a user selection of duration of the first interval of time of the candidate volume mirror simulation, and user selection of a maximum bandwidth between the primary data storage system and the secondary data storage system.

3. The computer program product of claim 1 wherein first interval of time includes a plurality of subintervals of time and wherein the candidate volume mirror simulation includes recording input/output (I/O) activity directed to at least one primary volume of the primary data storage system over each subinterval of time and measuring current host-to-primary performance of I/O activity recorded over each subinterval of time.

4. The computer program product of claim 3 wherein measuring current host-to-primary performance of recorded I/O activity includes measuring current host-to-primary throughput, current host-to-primary latency of the recorded I/O activity, and cache hits versus cache waits of the recorded I/O activity.

5. The computer program product of claim 4 wherein the storage controller processor operations further comprise:
determining at least one of an expected host-to-primary throughput for each subinterval of time as a function of measured current host-to-primary throughput for each subinterval of time, and an average expected host-to-primary throughput for the first interval of time based upon an average of determined expected host-to-primary throughput for each subinterval of time.

6. The computer program product of claim 4 wherein the storage controller processor operations further comprise:
determining at least one of an expected host-to-primary latency for each subinterval of time as a function of measured current host-to-primary latency for each subinterval of time and an average expected host-to-primary latency for the first interval of time based upon an average of determined expected host-to-primary latencies for each subinterval of time.

7. The computer program product of claim 3 wherein the secondary data storage system has a cache and a plurality of different classes of storage and wherein the candidate volume mirror simulation includes sending test packets of data from the primary data storage system to the secondary data storage system over each subinterval of time wherein a portion of the test packets sent each subinterval of time are directed to the cache of the secondary data storage system and a portion of the test packets sent each subinterval of time are directed to the plurality of different classes of storage of the secondary data storage system, and measuring primary-to-secondary latencies of test packets sent to the secondary data storage system over each subinterval of time including measuring primary-to-secondary latencies of test packets sent to the cache of the secondary data storage system over each subinterval of time and measuring primary-to-secondary latencies of test packets sent to the plurality of different classes of storage of the secondary data storage system over each subinterval of time for each class of storage of the secondary data storage system.

8. The computer program product of claim 7 wherein the storage controller processor operations further comprise:
determining at least one of an expected primary-to-secondary latency for each subinterval of time as a function of measured primary-to-secondary latencies of test packets sent to the secondary data storage system over each subinterval of time including measured primary-to-secondary latencies of test packets sent to the cache of the secondary data storage system over each subinterval of time and measured primary-to-secondary latencies of test packets sent to the plurality of different classes of storage of the secondary data storage system over each subinterval of time for each class of storage of the secondary data storage system, and an average expected primary-to-secondary latency for the first interval of time based upon an average of determined expected primary-to-secondary latencies for each subinterval of time.

9. The computer program product of claim 1 wherein the storage controller processor operations further comprise:
determining at least one of an expected recovery point objective (RPO) for each subinterval of time and an average expected RPO for the first interval of time based upon an average of the expected recovery point objective (RPO) for each subinterval of time.

10. A system for use with a host, and a secondary data storage system, comprising: a primary data storage system having a storage controller and at least one storage unit controlled by the storage controller and configured to store data in a primary volume, wherein the storage controller has a processor and a cache; and
a computer program product comprises a computer readable storage medium having program instructions embodied therewith, the program instructions executable by a processor of the storage controller to cause storage controller processor operations, the storage controller processor operations comprising: receiving user selections including a user selection of a candidate volume of the primary data storage system for mirroring to a secondary data storage system; simulating as a function of received user selections, mirroring of a selected candidate volume written directly to the secondary data storage system in a candidate volume mirror simulation over a first interval of time; and measuring performance of the candidate volume mirror simulation.

11. The system of claim 10 wherein the primary data storage system further has a user interface and wherein the storage controller processor operations further comprise:
receiving the user selections through the user interface of the primary data storage system wherein the user selections include a user selection of duration of the first interval of time of the candidate volume mirror simulation, and user selection of a maximum bandwidth between the primary data storage system and the secondary data storage system.

12. The system of claim 10 wherein first interval of time includes a plurality of subintervals of time and wherein the candidate volume mirror simulation includes recording input/output (I/O) activity directed to at least one primary volume of the primary data storage system over each subinterval of time and measuring current host-to-primary performance of I/O activity recorded over each subinterval of time.

13. The system of claim 12 wherein measuring current host-to-primary performance of recorded I/O activity includes measuring current host-to-primary throughput, current host-to-primary latency of the recorded I/O activity, and cache hits versus cache waits of the recorded I/O activity.

14. The system of claim 13 wherein the storage controller processor operations further comprise:
determining at least one of an expected host-to-primary throughput for each subinterval of time as a function of measured current host-to-primary throughput for each subinterval of time, and an average expected host-to-primary throughput for the first interval of time based upon an average of determined expected host-to-primary throughput for each subinterval of time.

15. The system of claim 13 wherein the storage controller processor operations further comprise:
determining at least one of an expected host-to-primary latency for each subinterval of time as a function of measured current host-to-primary latency for each subinterval of time
and an average expected host-to-primary latency for the first interval of time based upon an average of determined expected host-to-primary latencies for each subinterval of time.

16. The system of claim 12 wherein the secondary data storage system has a cache and a plurality of different classes of storage and wherein the candidate volume mirror simulation includes sending test packets of data from the primary data storage system to the secondary data storage system over each subinterval of time wherein a portion of the test packets sent each subinterval of time are directed to the cache of the secondary data storage system and a portion of the test packets sent each subinterval of time are directed to the plurality of different classes of storage of the secondary data storage system, and measuring primary-to-secondary latencies of test packets sent to the secondary data storage system over each subinterval of time including measuring primary-to-secondary latencies of test packets sent to the cache of the secondary data storage system over each subinterval of time and measuring primary-to-secondary latencies of test packets sent to the plurality of different classes of storage of the secondary data storage system over each subinterval of time for each class of storage of the secondary data storage system.

17. The system of claim 16 wherein the storage controller processor operations further comprise:
determining at least one of an expected primary-to-secondary latency for each subinterval of time as a function of measured primary-to-secondary latencies of test packets sent to the secondary data storage system over each subinterval of time including measured primary-to-secondary latencies of test packets sent to the cache of the secondary data storage system over each subinterval of time and measured primary-to-secondary latencies of test packets sent to the plurality of different classes of storage of the secondary data storage system over each subinterval of time for each class of storage of the secondary data storage system,
and an average expected primary-to-secondary latency for the first interval of time based upon an average of determined expected primary-to-secondary latencies for each subinterval of time.

18. The system of claim 10 wherein the storage controller processor operations further comprise:
determining at least one of an expected recovery point objective (RPO) for each subinterval of time and an average expected RPO for the first interval of time based upon an average of the expected recovery point objective (RPO) for each subinterval of time.

19. A method, comprising: receiving user selections including a user selection of a candidate volume of a primary data storage system for mirroring to a secondary data storage system; simulating as a function of received user selections, mirroring of a selected candidate volume written directly to the secondary data storage system in a candidate volume mirror simulation over a first interval of time; and measuring performance of the candidate volume mirror simulation.

20. The method of claim 19 further comprising:
receiving the user selections through a user interface of a data storage system wherein the user selections include a user selection of duration of the first interval of time of the candidate volume mirror simulation, and user selection of a maximum bandwidth between the primary data storage system and the secondary data storage system.

21. The method of claim 19 wherein first interval of time includes a plurality of subintervals of time and wherein the candidate volume mirror simulation includes recording input/output (I/O) activity directed to at least one primary volume of the primary data storage system over each subinterval of time and measuring current host-to-primary performance of I/O activity recorded over each subinterval of time.

22. The method of claim 21 wherein measuring current host-to-primary performance of recorded I/O activity includes measuring current host-to-primary throughput, current host-to-primary latency of the recorded I/O activity, and cache hits versus cache waits of the recorded I/O activity.

23. The method of claim 22 further comprising:
determining at least one of an expected host-to-primary throughput for each subinterval of time as a function of measured current host-to-primary throughput for each subinterval of time, and an average expected host-to-primary throughput for the first interval of time based upon an average of determined expected host-to-primary throughput for each subinterval of time.

24. The method of claim 22 further comprising:
determining at least one of an expected host-to-primary latency for each subinterval of time as a function of measured current host-to-primary latency for each subinterval of time
and an average expected host-to-primary latency for the first interval of time based upon an average of determined expected host-to-primary latencies for each subinterval of time.

25. The method of claim 21 wherein the candidate volume mirror simulation includes sending test packets of data from the primary data storage system to the secondary data storage system over each subinterval of time wherein a portion of the test packets sent each subinterval of time are directed to cache of the secondary data storage system and a portion of the test packets sent each subinterval of time are directed to a plurality of different classes of storage of the secondary data storage system, and measuring primary-to-secondary latencies of test packets sent to the secondary data storage system over each subinterval of time including measuring primary-to-secondary latencies of test packets sent to the cache of the secondary data storage system over each subinterval of time and measuring primary-to-secondary latencies of test packets sent to the plurality of different classes of storage of the secondary data storage system over each subinterval of time for each class of storage of the secondary data storage system.

26. The method of claim 25 further comprising:
determining at least one of an expected primary-to-secondary latency for each subinterval of time as a function of measured primary-to-secondary latencies of test packets sent to the secondary data storage system over each subinterval of time including measured primary-to-secondary latencies of test packets sent to the cache of the secondary data storage system over each subinterval of time and measured primary-to-secondary latencies of test packets sent to the plurality of different classes of storage of the secondary data storage system over each subinterval of time for each class of storage of the secondary data storage system,
and an average expected primary-to-secondary latency for the first interval of time based upon an average of determined expected primary-to-secondary latencies for each subinterval of time.

27. The method of claim 19 further comprising:
determining at least one of an expected recovery point objective (RPO) for each subinterval of time and an average expected RPO for the first interval of time based upon an average of the expected recovery point objective (RPO) for each subinterval of time.

\* \* \* \* \*